United States Patent [19]
van Zijderveld

[11] Patent Number: 6,085,896
[45] Date of Patent: *Jul. 11, 2000

[54] CHAIN CONVEYOR TRACK OF HIGH-GRADE AND LOW-GRADE PLASTIC

[75] Inventor: George Johannes van Zijderveld, 's-Gravenzande, Netherlands

[73] Assignee: MCC Nederland B.V., Netherlands

[*] Notice: This patent issued on a continued prosecution application filed under 37 CFR 1.53(d), and is subject to the twenty year patent term provisions of 35 U.S.C. 154(a)(2).

[21] Appl. No.: 08/800,409

[22] Filed: Feb. 14, 1997

[30] Foreign Application Priority Data

Feb. 14, 1996 [NL] Netherlands ............................. 1002350

[51] Int. Cl.[7] .......................... B65G 21/22; B65G 17/08; B65G 17/40; B29C 39/10
[52] U.S. Cl. ........................ 198/841; 198/805; 198/831
[58] Field of Search .................................. 198/837, 841, 198/860.2, 805, 831

[56] References Cited

U.S. PATENT DOCUMENTS

| | | | |
|---|---|---|---|
| 4,164,283 | 8/1979 | Flajnik | 198/831 X |
| 4,643,298 | 2/1987 | Wallaart | 198/805 |
| 4,981,207 | 1/1991 | Kuikka | 198/841 X |
| 5,127,515 | 7/1992 | Damkjaer | 198/831 |
| 5,165,527 | 11/1992 | Garbagnati | 198/831 X |
| 5,199,551 | 4/1993 | Wallaart et al. | 198/831 X |

FOREIGN PATENT DOCUMENTS

| | | |
|---|---|---|
| 0 366 170 | 5/1990 | European Pat. Off. . |
| 89 01 563 | 7/1989 | Germany . |
| 325333 | 7/1989 | WIPO ................................. 198/805 |

*Primary Examiner*—Robert P. Olszewski
*Assistant Examiner*—Gerald J. O'Connor
*Attorney, Agent, or Firm*—Varnum, Riddering, Schmidt & Howlett LLP

[57] ABSTRACT

Upper part and return part of a bend segment for a chain conveyor provided with a conveyor chain movable over a track with at least one bend zone, which bend segment consists of at least one substantially U-shaped element made of plastic, which element comprises two legs forming the rails which the chain can move over or in, respectively, as well as a connecting portion connecting the legs of the element with each other, and which chain is provided with links each provided with a substantially rectangular bearing surface and a connection system situated under the bearing surface, wherein at least the portion of the legs of the bend segment that forms the guide for the bearing surfaces and connection systems of the chain links is manufactured from a first, high-grade type of plastic material, and the residual portion, if any, of the legs and the connecting portion are manufactured from at least a second, cheaper type of plastic material, for instance a recycled plastic material.

11 Claims, 2 Drawing Sheets

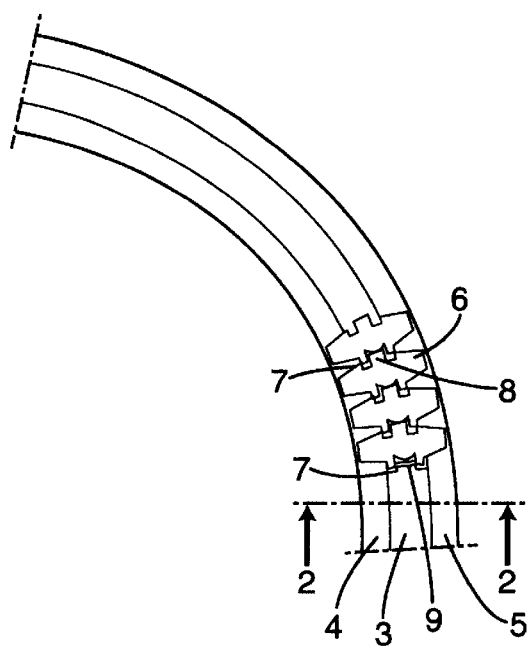
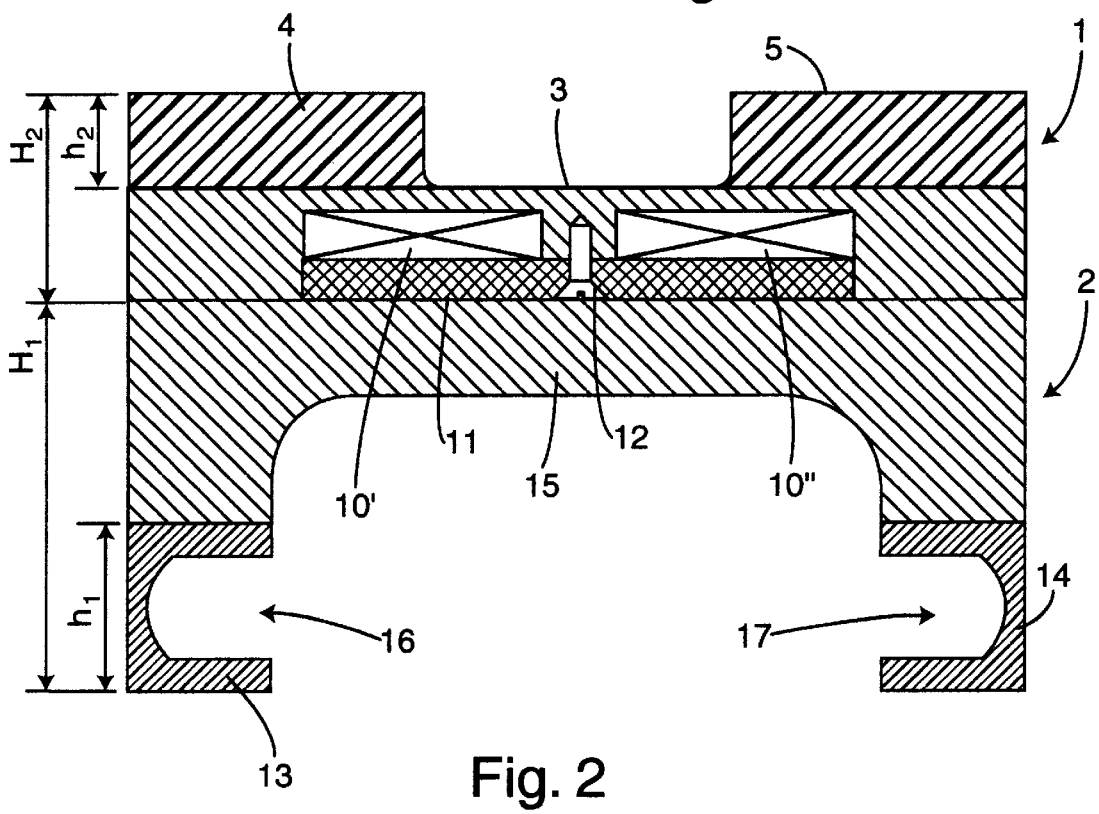

CHAIN CONVEYOR TRACK OF HIGH-GRADE AND LOW-GRADE PLASTIC

BACKGROUND OF THE INVENTION

Field of the Invention

This invention relates to an upper part of a bend segment for a chain conveyor provided with a conveyor chain movable over a track with at least one bend zone, which upper part consists of at least one substantially U-shaped element made of plastic, which element comprises two legs forming the rails over which the chain can move as well as a connecting portion connecting the legs of the element with each other, and which chain is provided with links each provided with a substantially rectangular bearing surface and a connection system situated below the bearing surface, the successive links being hingedly coupled to each other through the connection systems thereof.

Such an upper part for a bend segment is known from Dutch patent application 9100690. In the known bend segment the links consist at least partly of a magnetizable material, and permanent magnets are accommodated in spaces recessed in the bottom face of the connecting portion connecting the solid legs, and the spaces for the magnets are provided in the bottom face. This provides the advantage, among others, that the bend segment is suitable both for use with plastic chains whose chain links are coupled through hinge pins from a ferromagnetic material, and for use with metal chains whose chain links are made from a ferromagnetic material. The magnets then ensure that the bearing surfaces of the chain links remain flat on the rails in the bend. The known bend segment further comprises a lower or return part for guiding the returning portion of the conveyor chain, which does not carry any products. There also exist upper parts of bend segments where the facing side surfaces of the legs of the bend segment are provided with guide slots or extend at an angle relative to the transport surface. The connection systems of the chain links are then provided with projecting lips (tabs) or slanting surfaces formed on the side, which cooperate, respectively, with the slots or the side surfaces extending at an angle, in order to keep the chain links made of plastic or metal flat in the bend.

SUMMARY OF THE INVENTION

The object of the invention is to provide the possibility of manufacturing the upper part of such bend segments more cheaply and to that end the invention provides an upper part of the aforementioned kind, characterized in that at least the portion of the legs of the upper part that forms the guide for the bearing surfaces and connection systems of the chain links consists of a first, high-grade type of plastic material, that the residual portion, if any, of the legs and the connecting portion consist of at least a second type of plastic material, and that the upper part is manufactured from a single composite plate of plastic material.

The invention also provides a lower part for a chain conveyor, which lower part consists of at least one substantially U-shaped element made of plastic, which element comprises two legs with slotted openings formed in the facing side surfaces of the legs for guiding the side edges of the bearing surfaces of the links of a conveyor chain consisting of links with a substantially rectangular bearing surface and a connection system situated below the bearing surface, the successive links being hingedly connected to each other through the connection systems thereof, as well as a connecting portion connecting the legs of the element with each other, characterized in that at least the portion of the legs of the lower part that forms the guide for the bearing surfaces and connection systems of the chain links consists of a first, high-grade type of plastic material, that the residual portion, if any, of the legs and the connecting portion consist of at least a second type of plastic material, and that the lower part is manufactured from a single composite plate of plastic material.

The invention is based on the insight that a large part of the upper part and the lower or return part of a bend segment does not come into contact with the links of the conveyor chain and therefore need not have any particular wear resistance or good sliding properties. Both in an upper part and in a return part, the chain links come exclusively into contact with a portion of the legs thereof. The residual portion of the legs and the connecting portion serve exclusively to give the bend segment or the return part the necessary shape and stability. This residual portion, both in the bend segment and in the return part, accounts for more than half of the total volume and is manufactured according to the invention from a plastic material that is cheaper than the material from which the rest of the upper or return part is manufactured.

Preferably, the second type of plastic material is a recycled plastic material.

As is well known, upper parts and return parts of the subject type are obtained by milling them from a plate of plastic material. According to the invention, to that end, use is made of a composite plate of plastic material consisting of a first layer of a high-grade plastic material, for instance UHMWPE, which is highly wear-resistant, and a second layer of a recycled plastic material.

The plate of plastic material can be fabricated as a composite plate, for instance by bringing in a known manner a layer of granulate of the recycled plastic and a layer of granulate of the high-grade plastic in a mould and subsequently compressing same under high pressure, or by successively moulding two kinds of plastic material in a mould. It is also possible to obtain a composite plastic plate by gluing onto each other a plate from, for instance, UHMWPE and a plate from recycled plastic.

It is noted that DE-U-8,901,563 discloses a bend segment for a chain conveyor, which segment is built up from an upper part having on the legs thereof guide strips from a wear-resistant plastic, to be fastened separately, and a lower part. However, this publication does not describe the manufacture of an upper or lower part from a single, composite material plate, and so the bend segment described is very laborious to produce. Nor is it known from this publication, in the case of an upper part with solid legs, that is, without spaces for accommodating magnets, to use partly wear-resistant material and partly inexpensive plastic material.

The cost price of the high-grade material is currently about NLG 10.—/kg and that of recycled plastic is less than NLG 5.—/kg. By the feature according to the invention, owing to the use of recycled plastic, the eventual cost price of an upper part for a bend segment can be lower by at least about 15% and that of a return part by at least 25%.

It is also possible, within the scope of the invention, for a bend segment consisting of an upper part and a lower part to be fabricated as one whole, for instance in the manner described in Dutch patent application 1001648, whereby, viewed in vertical direction, the bend segment consists of a first portion of high-grade plastic, a second, central portion of cheap plastic, and a third portion of high-grade plastic, with the first and the third portions forming the guide for the chain. The three portions are part of a single material plate consisting of three layers.

BRIEF DESCRIPTION OF THE DRAWINGS

Further advantages of the invention will be elucidated hereinafter on the basis of the description of an exemplary embodiment of the invention, with reference to the drawings, wherein:

FIG. 1 shows a top plan view of a single bend segment according to the invention, with a length of the conveyor chain thereon; and FIG. 2 is a cross-section of the bend segment and the associated return part, along the line II—II in FIG. 1.

DETAILED DESCRIPTION

Figure 3:
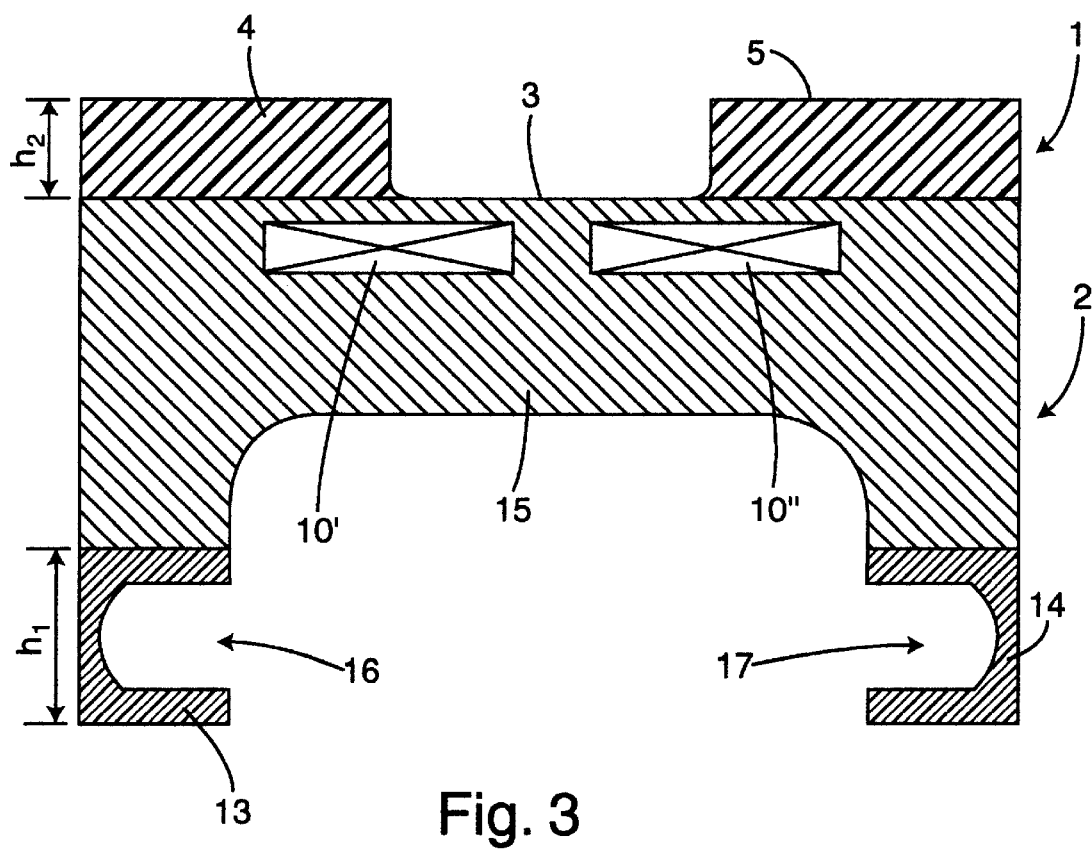
FIG. 3 is a view corresponding to FIG. 2, but showing an alternative embodiment with the upper and lower parts constructed as a single piece.

Although the invention is elucidated on the basis of an exemplary embodiment of a so-called magnetic bend, the invention can be used with equal advantage in bend segments known to be used with metal or plastic chains provided with bevels or tabs to guide the chain in the bend in a mechanical manner rather than through magnetic force.

The upper part 1 and the return part 2 for a bend segment according to the exemplary embodiment are formed entirely from plastic and, in the case of a single bend, are each substantially U-shaped in cross section. The upper part comprises an intermediate portion 3 and two solid parallel upright leg portions 4 and 5, the top side of which forms the rails for the conveyor chain. This chain is made up of links 6, whose bearing surface is made of plastic or of magnetizable, preferably ferromagnetic steel, which bearing surface is provided on one side with spaced hinge loops 7 and on the other side with a centrally located hinge loop 8. The hinge loops 7 and 8 are connected to each other through a hinge pin 9 which, at any rate when the bearing surfaces are made of plastic, is made of a magnetizable and preferably ferromagnetic material.

In order to enable the chain to be readily lifted from the track in the bend segments as well, the maximum distance between the guiding surfaces constituted by the outside of the hinge loops 7 is preferably less than the minimum distance between the oppositely located guiding surfaces constituted by the inside of the upright leg portions 4 and 5. In practice, the guiding surfaces on the hinge loops 7 will in most cases extend perpendicularly relative to the bearing surface of the chain link 6, and the inside of the leg portions 4 and 5 will also extend perpendicularly relative to the plane of the rails. This enables a simple manufacture of both bend segment and chain links.

As appears clearly from FIG. 2, two permanent magnets 10" and 10" are arranged in the bottom surface of the bend segment, in spaces recessed in the intermediate surface for that purpose. Arranged below the magnets 10', 10" is a closure plate 11 for fixing the magnets in the bend segment, which closure plate is secured against the underside of the bend segment by means of, for instance, a screw 12. Preferably, the closure plate 11 is made from a ferromagnetic material, because it has been found that by providing such a closure plate, in the respective cases of a plastic chain and a steel chain, the force of attraction exerted on the hinge pins or the bearing surfaces increases further.

Instead of arranging the magnets 10', 10" in the connecting portion 3 between the legs 4 and 5, it is also possible, in the manner described in EP-A-0159074, to accommodate the magnets in chambers formed in the legs 4 and 5.

The return part 2 of the conveyor chain is formed by a U-shaped plastic element with two downwardly directed leg portions 13 and 14 and an intermediate portion 15. These leg portions are provided on the facing vertical sides thereof with grooves 16 and 17, which are intended to guide the sides of the bearing surfaces of the returning portion of the conveyor chain.

In FIG. 2 it is indicated through hatching that the solid legs 4 and 5 of the upper part and a portion of the legs 13 and 14 of the return part consist of a first type of plastic material, for instance UHMWPE, and that the residual portion of the upper part and the return part, respectively, consists of a second, cheaper type of plastic material, preferably a recycled material. Both plastic materials can beforehand have been moulded or pressed to form a plate and the upper part and the return part have then been formed from such a plate by milling. It is also possible first to form the separate portions of the upper or return part separately and then to join them together by means of screws or glue. Optionally the portions 3 and 15 can also form one whole when the bend segment is of the type described in NL-A-1001648.

To clarify what saving in costs can be obtained, sizes of an upper part and a return part occurring in practice are given below by way of example:

Upper part: total height $H_2$=27 mm; height of the high-grade material portion of the legs $h_2$=12 to 13 mm.

Return part: total height $H_1$=55–63 mm; height of the high-grade material portion of the legs $h_1$=20 mm.

To those skilled in the art it will be clear immediately that by the use of two different plastic materials for the upper part and the return part a considerable saving in material cost is obtained, so that the cost price of the entire bend segment can be considerably lower. It will also be clear that within particular limits there is a choice as to what portion of the legs or connecting part will consist of cheap plastic material, as long as it is ensured that those portions that have a guiding function for the chain link consist of a high-grade wear-resistant material. Optionally, for the upper part and the return part different first and/or second types of plastic material can be used and it would even be conceivable, within the scope of the invention, that more than two different materials are used for each part, as long as it results in a saving in cost price compared with the use of a single type of material.

For the sake of completeness, it is noted that the invention is not limited to a single bend segment but can also be used with a so-called multiple bend segment, whereby a number of conveyor tracks side by side have been united into a bend segment. Such a bend segment in fact consists of a series of U-shaped plastic elements for upper parts forming one whole, while the adjacent U-shaped plastic elements for the return parts also consist of one whole.

What is claimed is:

1. An upper part of a bend segment for use in a chain conveyer comprising a conveyer chain movable over a track having at least one bend zone, said chain comprising a plurality of links, each having a substantially rectangular bearing surface, and a connection system interconnecting the links;

said upper part comprising a substantially U-shaped plastic element having first and second spaced apart legs and an interconnecting portion interconnecting said first and second spaced apart legs, said legs each comprising a main portion and an end portion, said end portions forming guides for said bearing surface;

said upper part being formed by milling from a single composite plate of plastic material;

said composite plate being formed by depositing a layer of high-grade, high-wear resistant type of plastic material in a mold for forming said end portions of each of said legs, by depositing a layer of a relatively lower-grade, lower-wear resistant type of plastic material in said mold for forming said interconnecting portion and said main portions of each of said legs, and by applying pressure to said mold.

2. A lower part of a bend segment for use in a chain conveyer comprising a conveyer chain movable over a track having at least one bend zone, said chain comprising a plurality of links, each having substantially rectangular bearing surface, and a connection system interconnecting the links;

said lower part comprising a substantially U-shaped plastic element having first and second spaced apart legs and an interconnecting portion interconnecting said first and second spaced apart legs, said legs each comprising main portion and an end portion, said end portions forming guides for said bearing surface;

said lower part being formed by milling from a single composite plate;

said composite plate being formed by depositing a layer of high-grade, high-wear resistant type of plastic material in a mold for forming said end portions of each of said legs, by depositing a layer of a relatively lower-grade, lower-wear resistant type of plastic material in said mold for forming said interconnecting portion and said main portions of each of said legs, and by applying pressure to said mold.

3. A unitary composite bend segment for use in a chain conveyer comprising a conveyer chain movable over a track having at least one bend zone, said chain comprising a plurality of links each having a substantially rectangular bearing surface and a connection system interconnecting the links, said bend segment comprising:

an upper part comprising a substantially U-shaped plastic element having upper spaced apart legs, a lower part comprising a substantially U-shaped plastic element having lower spaced apart legs and an interconnection portion interconnecting said spaced apart legs of said lower part and said spaced apart legs of said upper part;

said upper spaced apart legs and said lower spaced apart legs each comprising a main portion and an end portion, said end portions forming guides for said bearing surfaces;

said bend segment being formed by milling from a single composite plate of plastic material;

said composite plate of plastic material being formed by depositing layers of a high-grade, high-wear resistant type of plastic material in a mold for forming said end portions of each of said legs, depositing a lower-grade, lower-wear resistant type of plastic material in said mold for forming said interconnection portion and said main portions of each of said legs, and by applying pressure to said mold to form said single composite plate.

4. An upper part of a bend segment for use in a chain conveyer comprising a conveyer chain movable over a track having at least one bend zone, said chain comprising a plurality of links, each having a substantially rectangular bearing surface, and a connection system interconnecting said links;

said upper part comprising a substantially U-shaped plastic element having first and second spaced apart legs and an interconnecting portion interconnecting said first and second spaced apart legs, said legs each comprising a main portion and an end portion, said end portions forming guides for said bearing surfaces;

said upper part being formed by milling from a single composite plate of plastic material;

said composite plate being formed by gluing a layer of a high-grade, high-wear resistant plastic material to a layer of lower-grade, lower-wear resistant plastic material and wherein said main portion of each of said legs and said interconnecting portions are formed from said layer of lower-wear resistant plastic material and said end portion of each of said legs is formed from said high-wear resistant plastic material.

5. A lower part of a bend segment for use in a chain conveyer comprising a conveyer chain movable over a track having at least one bend zone, the chain comprising a plurality of links, each having a substantially rectangular bearing surface, and a connection system interconnecting the links;

said lower part comprising a substantially U-shaped plastic element having first and second spaced apart legs and an interconnecting portion interconnecting the first and second spaced apart legs, said legs each comprising a main portion and an end portion, said end portions forming guides for said bearing surfaces;

said lower part being formed by milling from a single composite plate of plastic material;

said composite plate being formed by gluing a layer of a high-grade, high-wear resistant plastic material to a layer of lower-grade, lower-wear resistant plastic material and wherein said main portion of each of said legs is formed from said layer of said lower-wear resistant plastic material and said end portion of each of said legs are formed from said high-wear resistant plastic material.

6. A unitary composite bend segment for use in a chain conveyer comprising a conveyer chain movable over a track having at least one bend zone, said chain comprising a plurality of links, each having a substantially rectangular bearing surface, and a connection system interconnecting said links, said bend segment comprising:

an upper part comprising a substantially U-shaped plastic element having upper spaced apart legs, a lower part comprising a substantially U-shaped plastic element having lower spaced apart legs and an interconnection portion interconnecting said spaced apart legs of said lower part and said spaced apart legs of said upper part;

said upper spaced apart legs and said lower spaced apart legs each comprising a main portion and an end portion, said end portions forming guides for said bearing surfaces;

said bend segment being formed by milling from a single composite plate of plastic material;

said composite plate of plastic material being formed by gluing layers of a high-grade, high-wear resistant plastic material to opposite sides of a layer of relatively lower-grade, lower-wear resistant plastic material and wherein said main portion of each of said legs is formed from said layer of said lower-wear resistant plastic material and said end portion of each of said legs is formed from said high-grade, high-wear resistant plastic material.

7. A unitary composite bend segment for use in a chain conveyer comprising a conveyer chain movable over a track having at least one bend zone, said chain comprising a plurality of links each having a substantially rectangular bearing surface and a connection system interconnecting the links, said bend segment comprising:

an upper part comprising a substantially U-shaped plastic element having upper spaced apart legs, a lower part comprising a substantially U-shaped plastic element having lower spaced apart legs and an interconnection portion interconnecting said spaced apart legs of said lower part and said spaced apart legs of said upper part;

said upper spaced apart legs and said lower spaced apart legs each comprising an end portion, said end portions forming guides for said bearing surfaces;

said bend segment being formed by milling from a single composite plate of plastic material;

said composite plate of plastic material being formed by depositing layers of a high-grade, high-wear resistant type of plastic material in a mold for forming at least portions of each of said legs, depositing a lower-grade, lower-wear resistant type of plastic material in said mold for forming said interconnection portion and by applying pressure to said mold to form said single composite plate.

8. A unitary composite bend segment for use in a chain conveyer comprising a conveyer chain movable over a track having at least one bend zone, said chain comprising a plurality of links, each having a substantially rectangular bearing surface, and a connection system interconnecting said links, said bend segment comprising:

an upper part comprising a substantially U-shaped plastic element having upper spaced apart legs, a lower part comprising a substantially U-shaped plastic element having lower spaced apart legs and an interconnection portion interconnecting said spaced apart legs of said lower part and said spaced apart legs of said upper part;

said upper spaced apart legs and said lower spaced apart legs each comprising an end portion, said end portions forming guides for said bearing surfaces;

said bend segment being formed by milling from a single composite plate of plastic material;

said composite plate of plastic material being formed by gluing layers of a high-grade, high-wear resistant plastic material to opposite sides of a layer of relatively lower-grade, lower-wear resistant plastic material and wherein said end portion of each of said legs is formed from said high-grade, high-wear resistant plastic material.

9. An upper part of a bend segment for use in a chain conveyer comprising a conveyer chain movable over a track having at least one bend zone, said chain comprising a plurality of links, each having a substantially rectangular bearing surface, and a connection system interconnecting said links;

said upper part comprising a substantially U-shaped plastic element having first and second spaced apart legs and an interconnecting portion interconnecting said first and second spaced apart legs, said legs each comprising a main portion and an end portion, said end portions forming guides for said bearing surfaces;

said upper part being formed by milling from a single composite plate of plastic material;

said composite plate being formed by connecting a layer of a high-grade, high-wear resistant plastic material to a layer of lower-grade, lower-wear resistant plastic material and wherein said main portion of each of said legs and said interconnecting portions are formed from said layer of lower-wear resistant plastic material and said end portion of each of said legs is formed from said high-wear resistant plastic material.

10. A lower part of a bend segment for use in a chain conveyer comprising a conveyer chain movable over a track having at least one bend zone, the chain comprising a plurality of links, each having a substantially rectangular bearing surface, and a connection system interconnecting the links;

said lower part comprising a substantially U-shaped plastic element having first and second spaced apart legs and an interconnecting portion interconnecting the first and second spaced apart legs, said legs each comprising a main portion and an end portion, said end portions forming guides for said bearing surfaces;

said lower part being formed by milling from a single composite plate of plastic material;

said composite plate being formed by connecting a layer of a high-grade, high-wear resistant plastic material to a layer of lower-grade, lower-wear resistant plastic material and wherein said main portion of each of said legs is formed from said layer of said lower-wear resistant plastic material and said end portion of each of said legs are formed from said high-wear resistant plastic material.

11. A unitary composite bend segment for use in a chain conveyer comprising a conveyer chain movable over a track having at least one bend zone, said chain comprising a plurality of links, each having a substantially rectangular bearing surface, and a connection system interconnecting said links, said bend segment comprising:

an upper part comprising a substantially U-shaped plastic element having upper spaced apart legs, a lower part comprising a substantially U-shaped plastic element having lower spaced apart legs and an interconnection portion interconnecting said spaced apart legs of said lower part and said spaced apart legs of said upper part;

said upper spaced apart legs and said lower spaced apart legs each comprising a main portion and an end portion, said end portions forming guides for said bearing surfaces;

said bend segment being formed by milling from a single composite plate of plastic material;

said composite plate of plastic material being formed by connecting layers of a high-grade, high-wear resistant plastic material to opposite sides of a layer of relatively lower-grade, lower-wear resistant plastic material and wherein said main portion of each oef said legs is formed from said layer of said lower-wear resistant plastic material and said end portion of each of said legs is formed from said high-grade, high-wear resistant plastic material.

* * * * *

UNITED STATES PATENT AND TRADEMARK OFFICE
CERTIFICATE OF CORRECTION

PATENT NO. : 6,085,896
DATED : July 11, 2000
INVENTOR(S) : van Zijderveld, et. al.

It is certified that error appears in the above-identified patent and that said Letters Patent is hereby corrected as shown below:

Col. 8, claim 11, line 53:

Delete the word "oef" and substitute therefore --of--.

Signed and Sealed this

Twenty-second Day of May, 2001

Attest:

NICHOLAS P. GODICI

Attesting Officer   Acting Director of the United States Patent and Trademark Office